United States Patent [19]

Kohzai et al.

[11] 4,330,832
[45] May 18, 1982

[54] CUTTER FEED RATE CONTROL SYSTEM

[75] Inventors: Yoshinori Kohzai; Shigeki Kawada; Yoshiki Fujioka, all of Hino, Japan

[73] Assignee: Fujitsu Fanuc Limited, Hino, Japan

[21] Appl. No.: 128,173

[22] Filed: Mar. 7, 1980

[30] Foreign Application Priority Data

Mar. 13, 1979 [JP] Japan .................................. 54-29086

[51] Int. Cl.³ ............................................. G05B 19/18
[52] U.S. Cl. .................................... 364/474; 318/571
[58] Field of Search ................. 364/474, 475; 318/571

[56] References Cited

U.S. PATENT DOCUMENTS

| | | | |
|---|---|---|---|
| 3,665,493 | 5/1972 | Glowzewski et al. | 318/571 X |
| 3,728,595 | 4/1973 | Adams | 318/571 X |
| 3,976,861 | 8/1976 | Edwards et al. | 318/571 |
| 4,078,195 | 3/1978 | Mathias et al. | 318/571 X |
| 4,208,718 | 6/1980 | Chung | 364/474 |
| 4,237,408 | 12/1980 | Frecka | 364/475 X |

Primary Examiner—Jerry Smith
Attorney, Agent, or Firm—Staas & Halsey

[57] ABSTRACT

A method of, and apparatus for, controlling the feed rate of a cutter in a machine tool of the type in which a spindle is rotated by an electric motor having operating regions of constant torque and output characteristics so as to render constant the circumferential speed of a workpiece while the workpiece is subjected concurrently to a machining operation by moving a cutter into contact therewith. The apparatus includes mechanism for computing the maximum cutter feed rate, the circumferential speed $V_c$ of the workpiece, the cutting width d of the cutter and the maximum cutting quantity $Q_{max}$ which is decided by the maximum power $P_{max}$ of the motor, mechanism for computing a spindle speed $N_s$ from the circumferential speed $V_c$ and the outer diameter D of the workpiece, mechanism for comparing the magnitudes of a base speed $N_b$ and the spindle speed $N_s$, where the base speed $N_b$ is defined as a spindle speed at which there is a transition from the constant torque region of the motor to the constant output region thereof, and mechanism for computing the cutter feed rate $f_r$ from $f_{rmax}$, $N_s$ and $N_b$. The cutter is fed at the rate $f_{rmax}$ when $N_s \geq N_b$ and at the rate $f_r$ when $N_s < N_b$, whereby a cutting operation is performed while utilizing the power of the motor to the fullest possible extent.

6 Claims, 13 Drawing Figures

CUTTER FEED RATE CONTROL SYSTEM

BACKGROUND OF THE INVENTION

1. Field of the Invention

This invention relates to a method of controlling the feed rate of a cutter, and to the associated apparatus. In particular, the invention is directed to a cutter feed rate control method and apparatus suited for a machine tool in which an electric motor having operating regions of constant torque and constant output characteristics is employed for driving a spindle such that the machine tool can cut a workpiece while the circumferential speed of the workpiece is held constant by the motor.

2. Description of the Prior Art

In machine tools, particularly lathes, a cutting operation is performed while the circumferential speed of a workpiece is controlled so as to remain constant. Cutting a workpiece through this method of circumferential speed control affords the following advantages:

(1) The smoothness and luster of the workpiece surface are enhanced;

(2) Machining time (cutting) is shortened; and (3) Cutting quantity can be held constant.

The output power P [KW] of a spindle motor employed in a machine tool such as a lathe rises linearly until a specified speed (referred to as the base speed) $N_b$ is attained, and then a constant maximum value $P_{max}$ thereafter is kept. The cutting quantity Q is dependent upon the spindle motor output power P. Hence, the cutting quantity Q can be maximized and held constant at a maximum value $Q_{max}$ at the base speed $N_b$ or above, but decreases in accordance with its dependence upon speed for values less than $N_b$.

In control systems for maintaining a constant circumferential speed, the greater the outer diameter of a workpiece, the lower the motor or spindle speed $N_s$, the latter falling below the base speed $N_b$ if the outer diameter of the workpiece is greater than a certain value. Accordingly, when machining a workpiece having a large outer diameter with the prior-art control systems for maintaining a constant circumferential speed and, hence, a constant cutting quantity, it is conventional practice not to perform cutting at the maximum cutting quantity $Q_{max}$ based on the maximum output of the spindle motor, but to do so after deriving a certain cutting quantity Q. This is accomplished by first obtaining the minimum spindle speed which is decided by the maximum outer diameter $D_{max}$ of the workpiece, calculating the motor output power P (less than $P_{max}$) which conforms to the minimum spindle speed, and then finally obtaining the cutting quantity Q (less than $Q_{max}$) as decided by this output P. The cutting operation is then a matter of determining a cutter feed rate $f_r$ so as to satisfy the cutting quantity Q, and feeding the cutter in accordance with this feed rate $f_r$.

However, with this conventional cutting method the motor or spindle speed $N_s$ eventually surpasses the base speed $N_b$ owing to a gradual decrease in workpiece diameter as machining progresses. The cutting conditions may thus become such as will allow cutting to advance at the maximum cutting quantity $Q_{max}$. The foregoing method nevertheless constrains machining to proceed at the constant cutting quantity Q. As a result, cutting in accordance with the conventional method of circumferential speed control is beset by problems since it does not have the merit of constant circumferential speed control, nor permit full exploitation of spindle motor output power, nor a satisfactory shortening of machining time.

SUMMARY OF THE INVENTION

There is thus a demand for a cutter feed rate control apparatus that has the capability of cutting a workpiece at a maximum cutting quantity $Q_{max}$ even if the workpiece has a large outer diameter, or in other words, that permits spindle motor output power to be utilized to the fullest possible extent.

It is therefore an object of the present invention to provide a cutter feed rate control system which performs a cutting operation while exploiting fully the output power of a spindle motor at all times, this being achieved by performing cutting at a maximum cutting quantity $Q_{max}$, namely by feeding the cutter at a maximum feed rate, when the speed of the spindle is higher than a base speed, and by performing cutting at a cutting quantity reduced in accordance with the spindle speed, namely by reducing the feed rate of the cutter in accordance with the spindle speed, when the speed of the spindle is lower than the base speed.

It is another object of the present invention to shorten cutting time, even for workpieces of a large outer diameter, by increasing cutting quantity as the outer diameter of the workpiece diminishes with the advance of machining, or in other words, as the speed of the spindle increases.

Still another object of the present invention is to provide a novel cutter feed rate control apparatus that enables full utilization of spindle motor output power, as well as a system that permits the radius of a workpiece to be monitored in a simple manner.

Other features and advantages of the invention will be apparent from the following description taken in connection with the accompanying drawings.

DESCRIPTION OF THE PREFERRED EMBODIMENTS

Figure 1:
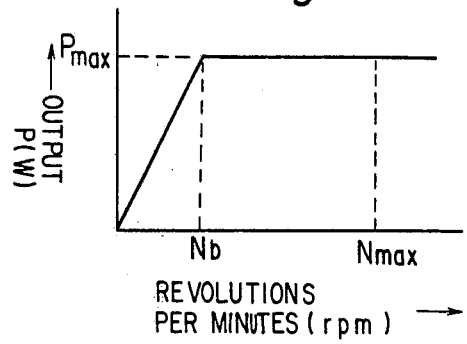
FIG. 1 is a graph showing the output-speed characteristic of an electric motor.

Reference will first be had to FIG. 1 which shows a graph useful in describing the output characteristic (output-speed characteristic) of an electric motor. The motor output power P can be seen to rise linearly until the spindle speed attains a value of $N_b$, after which the output power levels off at a constant value $P_{max}$. Torque $\tau$, though not shown in the graph, is related to output power P and motor or spindle speed $N_s$ by the equation $P = k \times N_s \times \tau (k:1.0269)$, and thus can be understood to be constant until the spindle speed attains the value $N_b$, after which the torque would be inversely proportional to the speed $N_s$. The regions of constant output and constant torque shall be referred to as constant output characteristic and constant torque characteristic regions, respectively, while the spindle speed $N_s$, at which there is a transition from the constant output characteristic region to the constant torque characteristic region, shall be referred to as a base speed $N_b$.

A quantity Q cut by a cutting tool depends upon the output power of the spindle motor and can therefore be held constant at a large value for spindle speeds above $N_b$ although it will decrease for speeds below $N_b$ in accordance with its dependence upon the spindle speed. It should also be noted that the constant output characteristic region is generally $\frac{2}{3}$ to $\frac{3}{4}$ of the overall range of motor speed.

Spindle speed $N_s$, with circumferential speed controlled so as to be held constant, is expressed by the equation $$N_s = V_c/\pi \cdot D \tag{1}$$

where $V_c$ is the circumferential speed and D the outer diameter of the workpiece, from which it follows that the greater the outer diameter D, the smaller the spindle speed $N_s$, with $N_s$ falling below the base speed $N_b$ if the outer diameter of the workpiece exceeds a certain value. A workpiece having a large outer diameter therefore cannot be cut at the maximum cutting quantity $Q_{max}$ which is decided by the maximum motor output $P_{max}$. Accordingly, in order to effect control such that the cutting quantity remains constant while the circumferential speed is similarly controlled, conventional practice prescribes calculating motor output P, which conforms to the minimum spindle speed decided by the maximum outer diameter $D_{max}$ of the workpiece, obtaining a cutting quantity $Q(<Q_{max})$ as decided by the output P, and then determining cutter feed rate $f_r$ so as to satisfy this cutting quantity. However, the outer diameter of the workpiece gradually decreases as machining progresses, and so it will finally become possible to carry out machining at the maximum cutting quantity $Q_{max}$ because the spindle speed will eventually surpass the base speed. Unfortunately, however, no change in the cutting quantity Q can be achieved with the conventional method even if the foregoing state is attained, and it is therefore not possible to cut a workpiece while making full use of the motor output power. But it must be pointed out that a cutting operation at the maximum cutting quantity $Q_{max}$ can be conducted, even with the conventional method, so long as the minimum spindle speed which is decided by the maximum outer diameter $D_{max}$, is greater than the base speed $N_b$. In other words, with the conventional method, the lower the base speed $N_b$ (the wider the constant output characteristic region), or the smaller the maximum outside diameter $D_{max}$ of the workpiece, the greater the share of time over which machining can be performed at the maximum cutting quantity $Q_{max}$. Accordingly, as far as the motor is concerned, the requirement is a constant output characteristic region of sufficient width.

Figure 2:
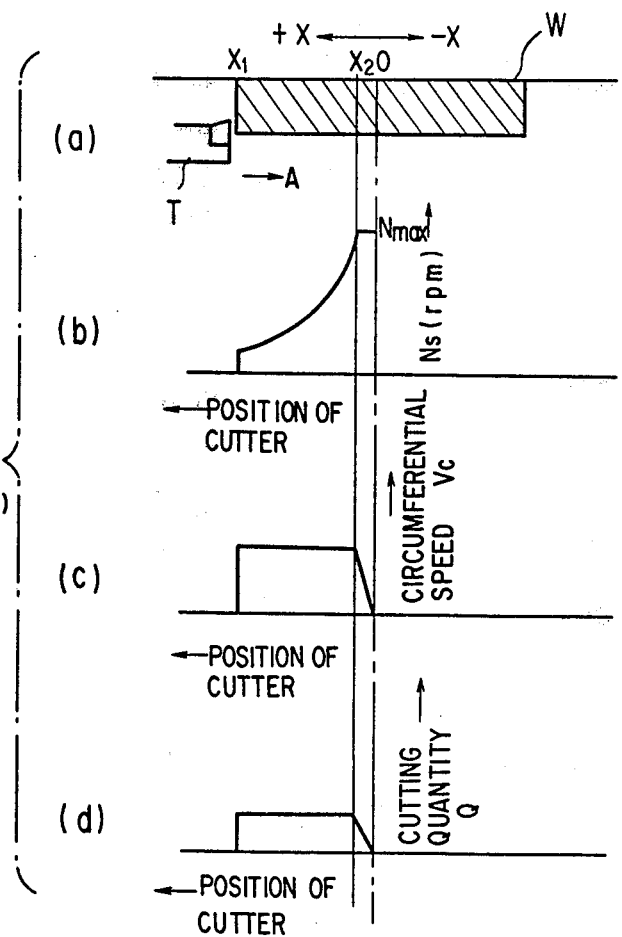
FIGS. 2a through 2d are diagrams useful in describing a cutting method by means of controlling the circumferential speed of a workpiece to a constant value according to the prior art.

A conventional cutting system is shown in FIGS. 2a through 2d, with a cutter designated T and a workpiece designated W in FIG. 2a which is useful in illustrating the cutting direction (indicated by the arrow A) of the cutter T, as well as the coordinates of the workpiece W. Specifically, the center of the workpiece is located at the origin (X=0) while one end thereof is at the coordinate $X_1$ ($D_{max}=X_1$). FIG. 2b is useful in describing how motor or spindle speed $N_s$ is related to the cutter position, i.e., the outer diameter of the workpiece. Thus it can be appreciated that the outer diameter of workpiece W decreases as machining by cutter T progresses, and that the spindle speed $N_s$ ($=V_c/\pi \cdot D$) rises. The smaller the diameter of the workpiece W, the greater the spindle speed $N_s$, although this will not become larger than the constant speed $N_{max}$, owing to the characteristic of the motor, and will level off at $N_{max}$ where $X=X_2$. FIG. 2c shows the circumferential (cutting) speed $V_c$ ($=\pi N_s \cdot D$) also plotted against cutter position, where it will be noted that the circumferential speed $V_c$ decreases linearly as the outer diameter of workpiece W assumes a small value, this occurring after the spindle speed $N_s$ has reached $N_{max}$. Finally, FIG. 2d illustrates cutting quantity Q versus cutter position, from which it can be seen that the magnitude of Q depends upon motor output power P at the minimum value of spindle speed $N_s$ which is decided by $V_c/\pi \cdot D_{max}$ when the outer diameter of the workpiece has its maximum value.

Thus it can be appreciated from the foregoing that the conventional method of circumferential speed control is flawed since the cutting quantity is decided by the motor output P (which is less than $P_{max}$) at the time that the outer diameter of the workpiece is maximum. This means that the output of the motor cannot be utilized fully at all times because the cutting quantity is unchangeable even when the motor output attains the value $P_{max}$ as machining progresses.

Figure 3:
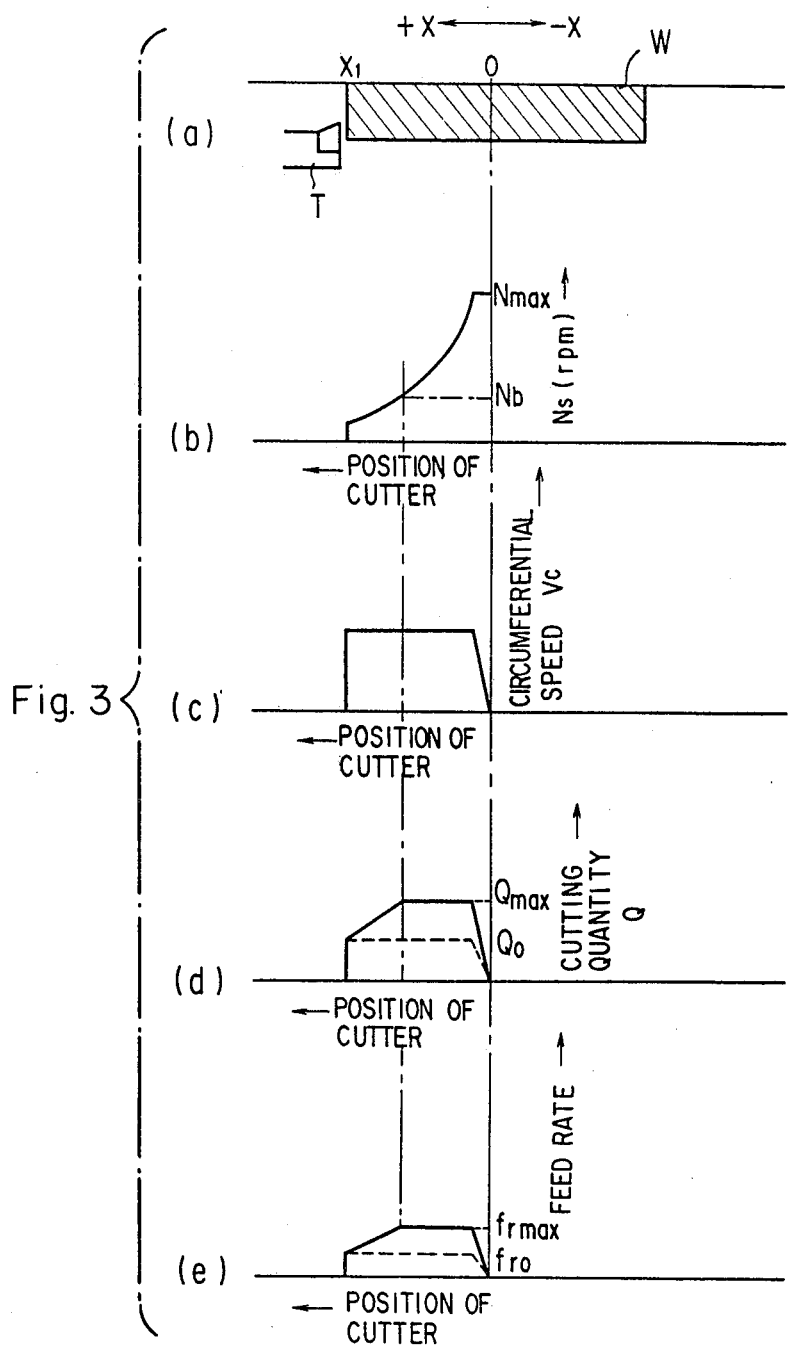
FIGS. 3a through 3e are diagrams useful in describing a cutter feed rate control method according to the present invention.

The fundamental principle of the present invention can be understood from FIG. 3 which illustrates the interrelationship between motor or spindle speed $N_s$, circumferential speed $V_c$, cutting quantity Q, cutter feed rate $f_r$, and the cutter position or radius of the workpiece. The dotted lines in the drawings show what the curves would look like in the case of the conventional system.

The cutting quantity Q, as discussed above with reference to the conventional system, is fixed by the motor speed and by the motor output characteristic which prevail when the outer diameter of the workpiece has its maximum value, and it is this unfortunate feature of the prior art that denies the full utilization of motor performance, this stemming from the fact that the cutting quantity Q cannot be changed even when the outer diameter of the workpiece decreases as machining progresses. However, cutting at a constant circumferential speed while fully exploiting motor performance can be made possible if the cutting quantity is enlarged in conformance with the motor output characteristic as the workpiece undergoes the gradual reduction in its outer diameter due to the cutting operation.

Since a proportional relationship generally exists between motor output P and cutting quantity Q, full use of motor performance can be achieved by effecting control such that, with the spindle speed $N_s$ less than the base speed $N_b$ ($N_s<N_b$), the cutting quantity Q is enlarged in proportion to $N_s$ as the outer diameter of the workpiece diminishes, namely as $N_s$ increases, but is leveled off at a maximum cutting quantity $Q_{max}$ in the region where $N_s \geq N_b$. The cutting quantity Q can be expressed by the following equation $$Q = f_r \cdot d \cdot V_c \tag{2}$$

where $V_c$ is the circumferential speed, d the width of the cutter, and $f_r$ the feed rate of the cutter.

When spindle speed $N_s$ is greater than the base speed $N_b$, the cutting quantity Q assumes a constant value $Q_{max}$ which is decided by the maximum output $P_{max}$ of the motor. The maximum cutter feed rate $f_{rmax}$ for obtaining $Q_{max}$ can therefore be determined from the following equation $$f_{rmax} = Q_{max}/d \cdot V_c \qquad (3)$$

where it is to be noted that d is a constant determined by the dimensions of the cutter, and that the circumferential speed $V_c$ is a quantity which, once set, is not changed, for to do so would not permit good surface smoothness and luster to be obtained.

Thus, in order to accomplish cutting at a constant circumferential speed $V_c$ while taking full advantage of motor performance, the feed rate $f_r$ of the cutter should be held constant at $f_{rmax}$ for $N_s \geq N_b$, but should be varied in proportion to $N_s$ for $N_s < N_b$. Moreover, an initial cutting quantity $Q_o$ should be derived from the motor speed and motor output characteristic at the time of maximum workpiece diameter, after which the feed rate $f_r (=Q_o/d \cdot V_c)$ obtained from equation (2) is taken as an initial feed rate $f_{ro}$.

Thus, in accordance with a feature of the present invention, $f_{rmax}$ is obtained from equation (3), whereby cutter feed rate $f_r$ is found from $$f_r = f_{rmax} \qquad (4)$$

for $N_s (=V_c/\pi \cdot D) \geq N_b$, and from $$f_r = f_{rmax} \cdot \frac{N_s}{N_b} \qquad (5)$$

for $N_s < N_b$.

A circuit block diagram for achieving the present invention as described above is shown in FIG. 4. The system includes an X-register XR for storing the current position of a cutter in terms of its distance from the center of a workpiece, the content of the register being incremented or decremented by pulses FP which are generated whenever the cutter is moved radially of the workpiece, this upcount/downcount operation depending upon the direction of cutter movement; an arithmetic circuit RVC which receives information relating to circumferential speed $V_c$ and the current position X of the cutter, i.e., the radius of the workpiece, and responds by performing the calculation $N_s = V_c/2\pi X$ to compute the speed $N_s$ of the spindle drive motor; a comparator circuit COM for comparing the magnitude of the motor speed $N_s$ against that of a base speed $N_b$; a maximum cutter feed rate arithmetic circuit MFRC which receives information indicative of circumferential speed $V_c$, cutter width d and maximum cutting quantity $Q_{max}$, and responds by computing the maximum cutter feed rate $f_{rmax}$ ($=Q_{max}/V_c \cdot d$); a register FRR for storing the maximum cutter feed rate $f_{rmax}$; a feed rate command circuit FRC which receives the information indicative of $N_s$, $N_b$, $f_{rmax}$ and the results of the comparison as provided by the comparator circuit COM, and responds by delivering the maximum cutter feed rate $f_{rmax}$ when $N_s \geq N_b$ and by performing the operation $$f_{rmax} \cdot \frac{N_s}{N_b}$$

when $N_s < N_b$, thereafter providing a command signal in the form of a cutter feed rate command $f_r$ which will be $f_{rmax}$ or $$f_{rmax} \cdot \frac{N_s}{N_b}$$

depending on the result of the foregoing operations; a speed control circuit VC for controlling the speed of a cutter drive motor MT in response to the feed rate command $f_r$; and a controller CN for controlling such items as the operational timing of the foregoing circuits as well as the processing of the arithmetic operations. The speed control circuit VC has a pulse interpolator PDC which executes a pulse interpolation on the basis of the cutter feed rate command $f_r$ and a X-direction command value $X_c$, obtained from a medium such as a paper tape which is not shown, that constrains the distance of the cutter to move in the X-direction, the pulse interpolator delivering a pulse train $X_p$ whose frequency conforms to the command rate $f_r$; a reversible counter RCN whose content is incremented whenever a pulse $X_p$ is generated (provided that the cutter is moving in the positive direction) and decremented whenever a feedback pulse FP is produced in response to a prescribed distance of cutter movement, the value stored in the counter thus being equivalent to a position deviation e, specifically the difference between the actual amount of cutter movement and the amount to which the cutter has been instructed to move to assume a certain position; a digital/analog converter DAC for generating an analog voltage which is proportional to the position deviation e; and an amplifier AMP. The system also includes a rotary encoder REC mounted on the shaft of the cutter drive motor MT so as to generate a single feedback pulse FP whenever the motor MT makes a specified degree of revolution, that is to say whenever the cutter moves the described distance.

Figure 4:
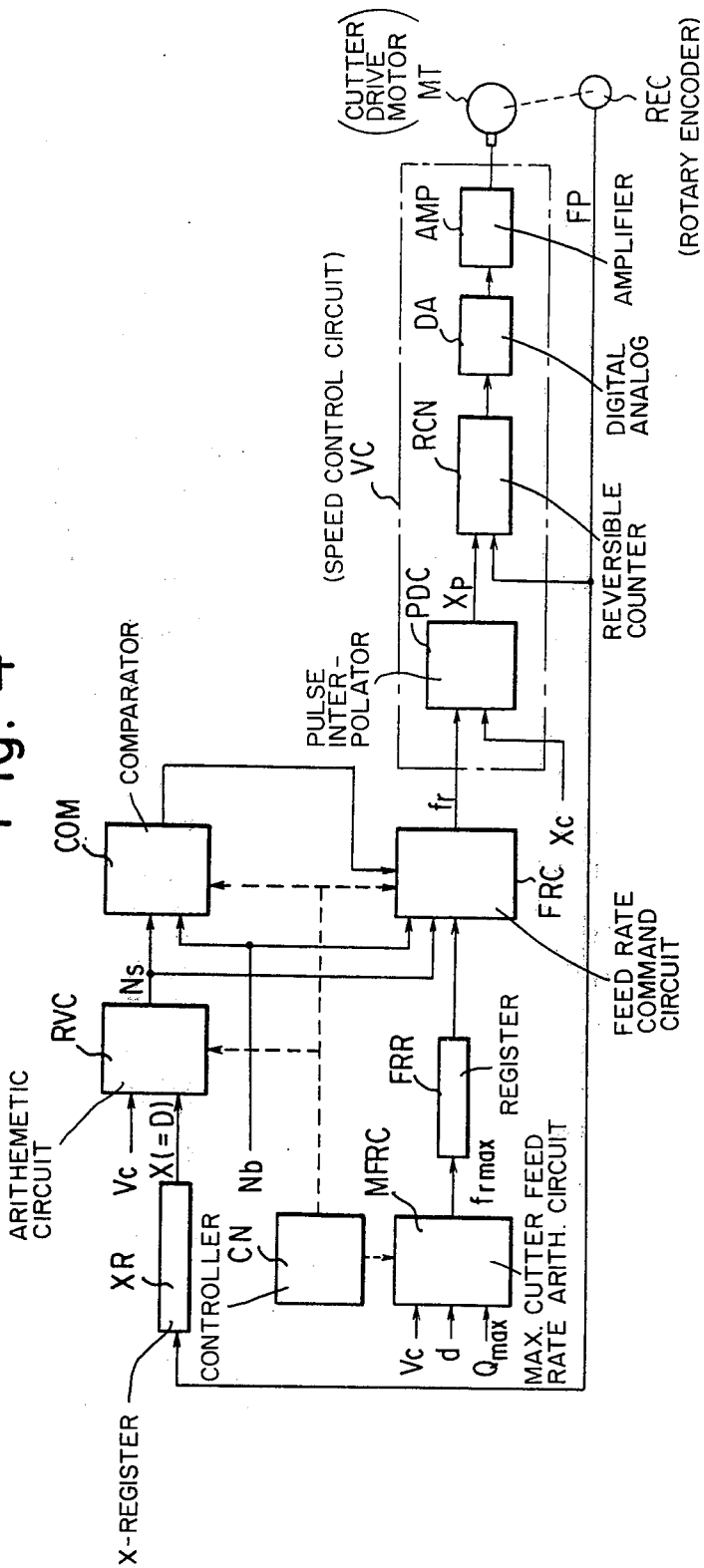
FIG. 4 is a circuit block diagram of a cutter feed rate control apparatus according to the present invention.

The system depicted in FIG. 4 operates as follows. First the maximum cutter feed rate $f_{rmax}$ is determined in arithmetic circuit MFRC using equation 3 and then stored in register FRR, while the speed $N_s$ of the spindle drive motor is found by means of arithmetic circuit RVC on the basis of the workpiece radius (position) stored in X-register XR. Although the content of X-register XR is not equivalent to the radius of the workpiece before the workpiece and cutter are brought into contact, this does not give rise to any difficulties because the cutting operation has not yet begun at this stage. Next the comparator circuit COM compares $N_s$ against $N_b$ and delivers the result, i.e., $N_s \geq N_b$ or $N_s < N_b$, to the feed rate command circuit FRC which responds by supplying the speed control circuit VC with a command signal $f_r$ indicative of cutter feed rate $f_{rmax}$ when $N_s \geq N_b$ or $$f_{rmax} \cdot \frac{N_s}{N_b}$$

when $N_s < N_b$. The speed control circuit $V_c$ controls the cutter feed rate in response to this instruction. More specifically, pulse interpolator PDC performs a pulse interpolation on the basis of the X-direction command value $X_c$ and the feed rate command $f_r$ and supplies a train of pulses $X_p$ to the reversible counter RCN. The digital content of the counter is then converted into an analog quantity which is subsequently amplified to actuate the cutter drive motor MT that moves the cutter (not shown). When the motor MT has rotated by a prescribed number of revolutions the rotary encoder issues a feedback pulse $F_p$ which decrements the value stored in the reversible counter RCN. This feedback pulse $F_p$ is also applied to X-register XR and either increments or decrements its stored value depending upon whether the cutter has been moved in the positive or negative direction, respectively. A repeat of the foregoing operation thus allows the cutter to be fed in accordance with the feed rate command $f_r$ at all times.

Figure 5:
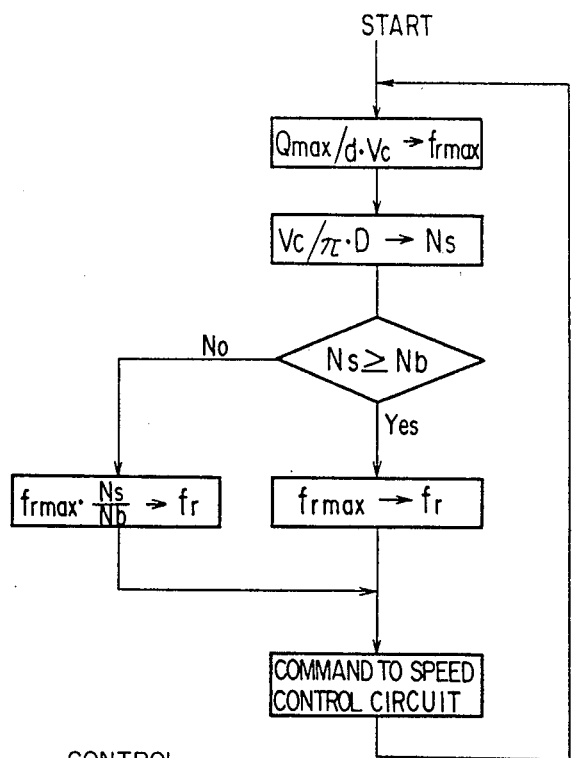
FIG. 5 is a flow chart useful in describing a cutter feed rate control method according to the present invention.

The method of cutter feed rate control according to the present invention can be more fully understood from the flow chart of FIG. 5 which is self-explanatory.

While the present invention has been illustrated with respect to the above embodiment which is provided with an arithmetic circuit in order to compute the maximum cutter feed rate $f_{rmax}$, this value is a constant which may be obtained in advance by any suitable means if the motor characteristic, cutter width d and circumferential speed $V_c$ have been decided. The value can be entered by means such as a tape and stored in, say, a register located in the speed command circuit. It should also be noted that while the arrangement of FIG. 4 includes individual units of hardware for the arithmetic and comparison operations, the present invention can be embodied by utilizing a processing unit such as a microcomputer. One such example is shown in FIG. 6 in which portions corresponding to those of FIG. 4 are denoted by like reference numerals and need not be described again here.

Figure 6:
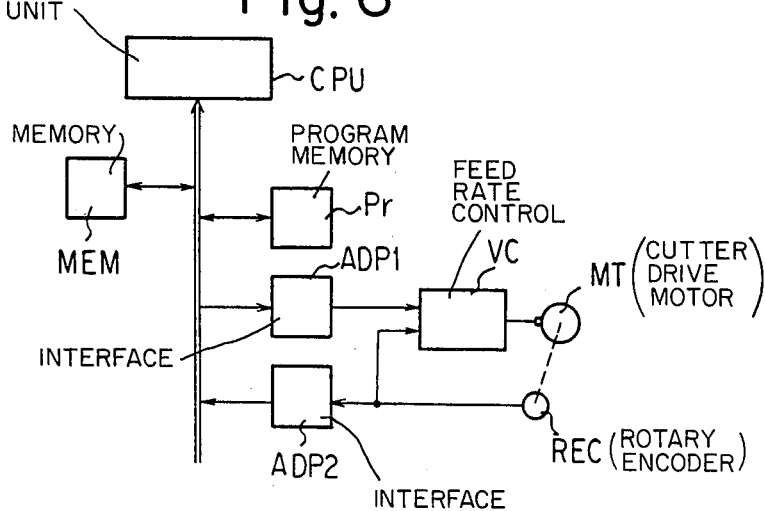
FIG. 6 is another circuit block diagram for effectuating cutter feed rate control according to the present invention.

The arrangement of FIG. 6 includes a control processing unit CPU, a memory MEM for storing data and the results of arithmetic operations, a program memory $P_r$ for storing a processing program which is programmed in accordance with the flow chart of FIG. 5, interfaces $ADP_1$, $ADP_2$ provided between servo control circuits, and a feed rate control circuit $V_c$. Common use can be made of memory MEM and program memory $P_r$.

It has been shown that the present invention provides a system which allows the performance of a motor to be utilized to the fullest possible extent while the circumferential speed of a workpiece is held constant, and permits a marked reduction in cutting time. The system therefore has a favorable cost performance, especially when applied to a lathe, since a workpiece can be machined without any restrictions being imposed by the diameter of the workpiece.

What we claim is:

1. In a method of controlling the feed rate of a cutter employed in a machine tool of the type in which a spindle is rotated by an electric motor having operating regions of constant torque and output characteristics so as to render constant the circumferential speed of a workpiece while the workpiece is subjected concurrently to a machining operation by moving a cutter into contact therewith, the improvement comprising the steps of:

storing a maximum cutter feed rate $f_{rmax}$ which is computed from a circumferential speed $V_c$ of the workpiece, a cutting width d of the cutter, and a maximum cutting quantity $Q_{max}$ decided by the maximum power $P_{max}$ of the motor;

computing a spindle speed $N_s$ from an equation $N_s = V_c/\pi \cdot D$ where D is the outer diameter of the workpiece;

comparing the magnitude of the spindle speed $N_s$ with the magnitude of a base speed $N_b$ defined as a spindle speed at which there is a transition from the constant torque region of the motor to the constant output region thereof; and feeding the cutter at the feed rate $f_{rmax}$ when $N_s \geq N_b$ and at a feed rate which is reduced in conformance with the spindle speed $N_s$ when $N_s < N_b$.

2. A method of controlling the feed rate of a cutter according to claim 1, further comprising a step of feeding the cutter at a feed rate $f_r$ which is computed from an equation $f_r = f_{rmax} \cdot N_s/N_b$ when $N_s < N_b$.

3. A method of controlling the feed rate of a cutter according to claim 1, in which the maximum feed rate $f_{rmax}$ is computed by using an equation $f_{rmax} = Q_{max}/d \cdot V_c$.

4. In an apparatus for controlling the feed rate of a cutter employed in a machine tool of the type in which a spindle is rotated by an electric motor having operating regions of constant torque and output characteristics so as to render constant the circumferential speed of a workpiece while the workpiece is subjected concurrently to a machining operation by moving a cutter into contact therewith, the improvement in said apparatus comprising:

memory means for storing a maximum cutter feed rate $f_{rmax}$ which is computed from a circumferential speed $V_c$ of the workpiece, a cutting width d of the cutter, and a maximum cutting quantity $Q_{max}$ decided by the maximum power $P_{max}$ of the motor;

spindle speed computing means for computing a spindle speed $N_s$ from the equation $N_s = V_c/\pi \cdot D$ where D is the outer diameter of the workpiece;

comparing means for comparing the magnitudes of a base speed $N_b$ and the spindle speed $N_s$, where the base speed $N_b$ is defined as a spindle speed at which there is a transition from the constant torque region of the motor to the constant output region thereof; and cutter feed rate computing means for computing a cutter feed rate $f_r$ from the equation $f_r = f_{rmax} \cdot N_s/N_b$;

wherein an output indicative of the maximum feed rate $f_{rmax}$ is obtained when $N_s \geq N_b$ and an output indicative of the feed rate $f_r$ is obtained when $N_s < N_b$ so that the cutter is fed at the feed rate $f_{rmax}$ or $f_r$ in conformance with the spindle speed.

5. An apparatus for controlling the feed rate of a cutter according to claim 4, further comprising computing means for computing the maximum cutter feed rate $f_{rmax}$ from the equation $f_{rmax} = Q_{max}/d \cdot V_c$ using the maximum cutting quantity $Q_{max}$, the circumferential speed $V_c$ and the cutter width d.

6. An apparatus for controlling the feed rate of a cutter according to claim 4, further comprising memory means for storing the distance from the center of the workpiece to the current position of the cutter, the content stored in said memory means being incremented or decremented whenever the cutter moves radially of the workpiece by a prescribed amount and in accordance with the direction of cutter movement, the value of said spindle speed $N_s$ being obtained by utilizing the content stored in said memory means as the value of the workpiece radius.

* * * * *

UNITED STATES PATENT AND TRADEMARK OFFICE
CERTIFICATE OF CORRECTION

PATENT NO. : 4,330,832
DATED : May 18, 1982
INVENTOR(S) : Kohzai et al

It is certified that error appears in the above-identified patent and that said Letters Patent is hereby corrected as shown below:

Front page, [73] Assignee, "Hino" s/b --Tokyo--.

Signed and Sealed this

Twelfth Day of October 1982

[SEAL]

Attest:

GERALD J. MOSSINGHOFF

Attesting Officer     Commissioner of Patents and Trademarks